Nov. 10, 1931.  H. F. SCHMIDT  1,831,466

PULVERIZED FUEL BURNER

Filed Sept. 14, 1927

WITNESS
E. Lutz

INVENTOR
H.F.Schmidt
BY
a. B. Reavis
ATTORNEY

Patented Nov. 10, 1931

1,831,466

UNITED STATES PATENT OFFICE

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA

PULVERIZED FUEL BURNER

Application filed September 14, 1927. Serial No. 219,470.

My invention relates to a method and apparatus for burning pulverized fuel and has for its object the provision of a powdered fuel furnace which shall be effective to completely burn the fuel in suspension therein and in which the process of combustion takes place without danger of injury to the furnace walls adjacent the zone of combustion.

Another object of my invention is to provide a method of burning pulverized fuel wherein a combustion zone is maintained in the furnace in which a turbulent mixture of fuel and air occurs and wherein a blanket of cooler medium separates the combustion zone from the immediately adjacent furnace walls.

In the design of powdered fuel furnaces, difficulties have been encountered due to the high temperature of combustion of the fuel in suspension damaging the walls of the furnace. A further difficulty has been encountered in so designing a furnace that the fuel in its passage therethrough is completely burned. Analysis of the dust escaping with the products of combustion passing from powdered fuel furnaces, as heretofore known to me, has usually shown that a substantial percentage of the particles contain a combustible nucleus of considerable proportion surrounded by an envelope of ash.

These and other difficulties are overcome, in accordance with my invention, by providing a furnace having a combustion chamber into which powdered fuel and air are discharged into an intermediate zone thereof and in opposed paths, whereby a combustion zone is maintained remote from the surrounding wall and is insulated therefrom by a blanket of cooler medium. In addition, the turbulence created in the combustion zone is so great that the fuel in suspension is violently agitated while burning, thus completely removing the ash envelopes of the particles and completely burning the fuel.

Apparatus embodying features of my invention is illustrated in the accompanying drawings forming a part of this specification, wherein.

Figure 1:
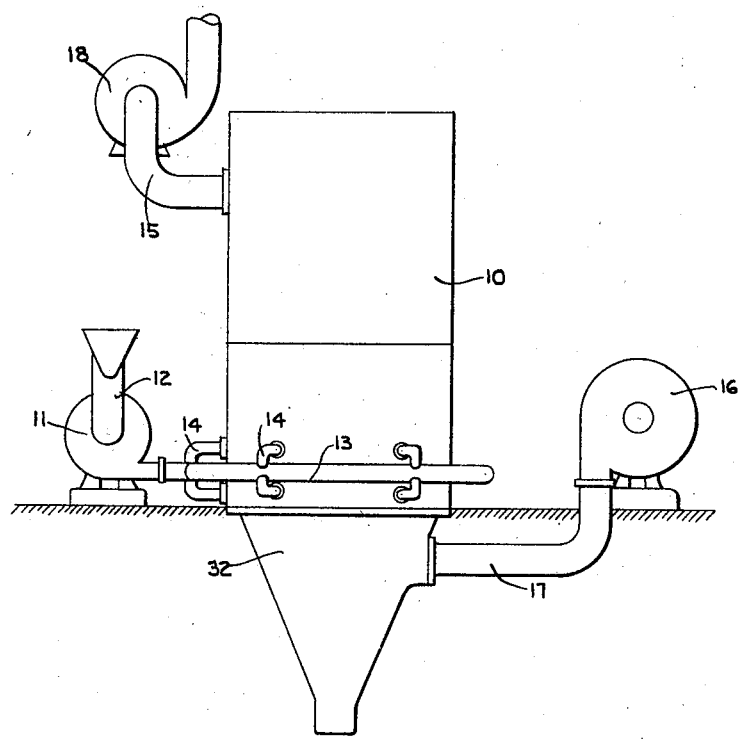
Fig. 1 is a diagrammatic view in elevation showing my invention as applied to a powdered fuel boiler furnace.

Referring now to the drawings I show, in Fig. 1, a boiler furnace 10 to which powdered fuel in suspension for combustion may be supplied by any suitable means, in the example shown by the centrifugal blower 11. The fuel and its conveying medium, preferably air, enters the blower 11 by means of an inlet conduit 12 and is discharged therefrom through a manifold or bustle pipe 13 having branch conduits 14 leading therefrom into the furnace 10. Air for combustion is supplied by means of a forced draft fan 16 and enters the furnace through a conduit 17 from the bottom. The products of combustion leave the furnace in the usual manner by an uptake 15 in which may be interposed an induced draft fan 18. While I have shown the powdered fuel in suspension entering the furnace from around the exterior thereof and the air for supporting combustion entering centrally from the bottom, it will be apparent from a further reading of this specification that the reverse might be employed with equal advantage and the fan 16 be considered as supplying fuel in suspension for combustion and the fan 11 considered as supplying air to support combustion. I, therefore, wish it to be distinctly understood that my invention is not limited to the particular arrangement first set forth.

Figure 2:
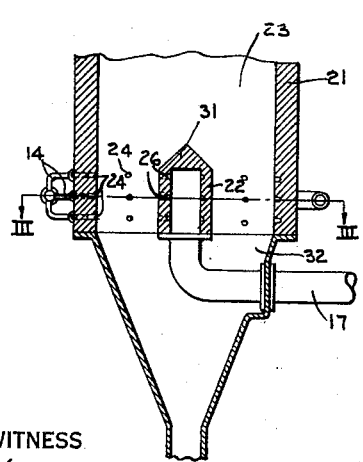
Fig. 2 is a central vertical sectional view of the furnace.
Figure 3:
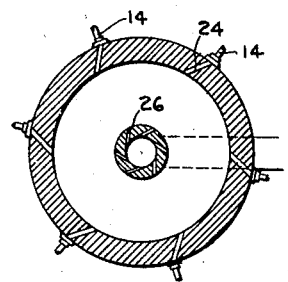
Fig. 3 is a sectional view taken along the line III—III of Fig. 2.

Referring now to Figs. 2 and 3, my improved furnace comprises a circular outer wall structure 21 and an inner inverted cup-like wall structure 22 cooperating with the wall structure 21 to form an annular combustion chamber 23. The outer wall structure 21 is provided with a plurality of series of chordal apertures 24 communicating with the conduits 14 for the supply of fuel in suspension into the furnace. The apertures 24 are disposed approximately tangentially of the central circular portion of the annular chamber 23. Strictly speaking, the apertures are disposed in directions chordal with respect to the inner surface of the walls 21, that is, lines which are coincident with the longitudinal center lines of the apertures 24 will be chords of a circle defined by the inner surface of the wall 21. By reason of the arrangement of these apertures, the pulverized fuel flowing therethrough will move rapidly about the chamber 23 in a circular path. The inverted, cup-like wall structure 22 is also provided with a plurality of apertures designated by the reference numeral 26. The apertures 26, like the apertures 24, are disposed in chordal directions with respect to the inner surface of the wall 21, but the apertures 26 are arranged in opposed relation to the apertures 24.

The interior of the inverted cup-like wall structure 22 communicates with the conduit 17 and the blower 16 so that air for combustion is impelled by way of said conduit to the interior of the wall structure 22 and is discharged therefrom through the aperture 26 in a direction opposed to the direction of the suspended fuel. The two streams meet approximately mid-stream of the annular combustion chamber 23 and there create a violent turbulent mixture which is burned in this intermediate zone. By reason of the construction and arrangement of the two sets of discharge apertures with respect to the walls of the combustion chamber, a cooling blanket of unmixed fuel is maintained between the combustion zone and the wall from which the fuel is discharged, and a cooling blanket of unmixed air is maintained between the combustion zone and the wall from which the air is discharged.

The inverted cup-like wall structure 22 is surmounted by a conically-shaped cover 31 so as to deflect falling ash and slag toward the bottom of the furnace from whence it may be removed in the usual manner as by a hopper 32.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a powdered fuel furnace, means defining a combustion chamber, means providing a rotating stream of pulverized fuel within said chamber, and means for injecting into said chamber a stream of gaseous media in a direction counter to the direction of movement of the fuel stream.

2. In a powdered fuel furnace, means defining an annular combustion chamber, means for discharging powdered fuel into said chamber and in a direction chordal with respect to the outer surface of the chamber, and means for injecting air under pressure into said chamber in a direction opposed to the path of movement of the powdered fuel.

3. In a powdered fuel furnace, means defining an annular combustion chamber, means for injecting a stream of pulverized fuel into said chamber in a chordal direction with respect to the outer surface of the chamber, and means for injecting a stream of air into said chamber in a direction chordal with respect to the outer surface of the chamber and counter to the flow of the fuel stream.

4. In a powdered fuel furnace, inner and outer walls defining an annular combustion chamber, means for injecting through one of said walls and into said chamber a stream of pulverized fuel in a direction chordal with respect to the inner surface of the outer wall of the chamber, and means for injecting through the other of said walls and into said chamber a stream of air also in a direction chordal with respect to the inner surface of the outer wall of the chamber and counter to the direction of movement of the fuel stream.

5. In a powdered fuel furnace, means defining an annular combustion chamber, nozzle means for supplying pulverized fuel into said chamber, and nozzle means for supplying air for supporting combustion into the chamber, one of the nozzle means being disposed at the outer side of the chamber and so arranged as to direct its stream of media in a direction chordal with respect to the outer surface of the chamber, and the other of the nozzle means being disposed in the inner portion of the chamber and being so arranged as to direct its stream of media into said chamber in a direction counter to the direction of flow of the stream from said one nozzle means.

6. In a powdered fuel furnace, means defining an annular combustion chamber, means disposed at the outer side of said chamber for injecting pulverized fuel in suspension into said chamber in a chordal direction with respect to the outer surface of the chamber, and means disposed at the inner side of said chamber for injecting gaseous media into said chamber in a direction counter to the direction of movement of the pulverized fuel in suspension.

7. In a powdered fuel furnace, wall members defining an annular combustion chamber, each of said wall members being provided with nozzle means opening into the combustion chamber and arranged to direct media flowing therethrough in directions chordal with respect to the outer wall of the combustion chamber, the nozzle means in one of the walls being arranged in opposed relation with respect to the nozzle means in the other wall, means for supplying powdered fuel in suspension through the nozzle means of one wall, and means for supplying air for combustion through the nozzle means of the other wall.

8. In a powdered fuel furnace, a circular wall structure, an inverted, cup-like wall structure encompassed by the first-mentioned wall structure and forming in conjunction therewith an annular combustion chamber, a plurality of series of nozzle means provided in the cooperating wall structures, the nozzle means in each of the wall structures being disposed to inject media into the combustion chamber in directions chordal with respect to the inner surface of the circular wall structure and the nozzle means in the circular wall structure being opposed to the nozzle means in the inverted, cup-like wall structure, means for discharging fuel in suspension through the nozzle means of one wall structure, and means for discharging air for combustion through the opposed nozzle means of the other wall structure.

9. In a powdered fuel furnace, a circular outer wall structure, an inner inverted, cup-like wall structure cooperating with the outer wall structure to form an annular combustion chamber, both of said wall structures being provided with a plurality of nozzle means disposed to inject media into the combustion chamber in directions chordal with respect to the inner surface of the outer wall structure, the nozzle means of the circular outer wall structure being disposed in opposed relation with respect to the nozzle means of the inner wall structure, fluid pressure developing means communicating with the nozzle means of the outer wall structure, other fluid pressure developing means communicating with the interior of the wall structure and with the nozzle means of said structure, means for supplying powdered fuel in suspension through the fluid pressure developing means and nozzle means of one of the wall structures, and means for supplying air for combustion through the other fluid pressure developing means and nozzle means of the other of said wall structures.

10. A method of burning powdered fuel which comprises causing powdered fuel in suspension to move in a circular path, directing air for combustion into the moving fuel and in a direction counter to the direction of movement of the fuel, and effecting the combustion of such fuel at the zone of its meeting with the air.

11. A method of burning powdered fuel which comprises providing a circular combustion zone by mixing fuel and air in the correct proportions at a temperature above the ignition point of the fuel, and then maintaining such circular combustion zone by simultaneously injecting into the zone powdered fuel in suspension and air for combustion, the powdered fuel in suspension being injected into one side of the combustion zone and in directions chordal with respect thereto and the air for combustion being injected into the opposite side of the combustion zone and in directions chordal with respect to the zone and counter to the initial direction of movement of the fuel so as to provide annular strata of relatively cool media around the combustion zone.

In testimony whereof, I have hereunto subscribed my name this 25th day of August, 1927.

HENRY F. SCHMIDT.